(12) United States Patent
Bradfield

(10) Patent No.: US 7,880,347 B2
(45) Date of Patent: Feb. 1, 2011

(54) AIRFLOW COOLING PATTERN FOR BELT-DRIVEN VEHICLE ELECTRICAL POWER GENERATOR

(75) Inventor: Michael D. Bradfield, Anderson, IN (US)

(73) Assignee: Remy Technologies, Inc., Pendleton, IN (US)

( * ) Notice: Subject to any disclaimer, the term of this patent is extended or adjusted under 35 U.S.C. 154(b) by 109 days.

(21) Appl. No.: 11/832,926

(22) Filed: Aug. 2, 2007

(65) Prior Publication Data

US 2009/0033161 A1 Feb. 5, 2009

(51) Int. Cl.
*H02K 9/06* (2006.01)

(52) U.S. Cl. .......................................... 310/59; 310/62

(58) Field of Classification Search .................. 310/52, 310/58, 59, 61, 62, 63
See application file for complete search history.

(56) References Cited

U.S. PATENT DOCUMENTS

| | | | | |
|---|---|---|---|---|
| 3,666,978 A | * | 5/1972 | Renner | 310/62 |
| 4,418,295 A | * | 11/1983 | Shiga | 310/59 |
| 4,476,405 A | * | 10/1984 | Komurasaki | 310/60 R |
| 4,514,652 A | * | 4/1985 | Olson | 310/54 |
| 4,554,472 A | * | 11/1985 | Kumatani | 310/62 |
| 4,584,496 A | * | 4/1986 | Frister | 310/60 R |
| 5,751,079 A | * | 5/1998 | Bagherpour et al. | 310/59 |
| 6,005,310 A | * | 12/1999 | Mosciatti et al. | 310/12 |

* cited by examiner

*Primary Examiner*—Dang D Le
(74) *Attorney, Agent, or Firm*—Cantor Colburn LLP

(57) ABSTRACT

A belt-driven electric machine for a vehicle includes a front housing including at least one front housing opening and a rear housing including at least one rear housing opening. The electric machine further includes at least one fan capable of urging cooling air into the electric machine through the at least one front housing opening and out of the electric machine through the at least one rear housing opening. A method for cooling a belt-driven electric machine for a vehicle includes urging cooling air into the electric machine at substantially the front of the electric machine. The cooling air is flowed substantially rearward in the electric machine, and heat is radiated from the electric machine into the cooling air. At least a first portion of the cooling air is expelled from the rear of the electric machine in a substantially axial direction.

17 Claims, 2 Drawing Sheets

AIRFLOW COOLING PATTERN FOR BELT-DRIVEN VEHICLE ELECTRICAL POWER GENERATOR

BACKGROUND OF THE INVENTION

This disclosure relates generally to electric machines. More specifically, this disclosure relates to cooling of belt-driven vehicle electrical power generators.

Underhood airflow in a vehicle is from the front of the vehicle to the rear due substantially to the action of radiator cooling fans disposed at the front of the vehicle. In contrast, however, cooling air typically enters an electric machine, for example, an alternator, at or near the rear of the alternator. The air flows through the alternator to the front of the alternator, being heated by the alternator components. The heated air is expelled from the alternator, combines with the underhood airflow, and is carried back to the rear of the alternator where at least a portion of the heated air is recirculated through the alternator. Depending on the alternator configuration, as much as 30-35% of the heated air is recirculated through the alternator, raising the temperature of the cooling air entering the alternator 20-30 degrees C. The increased temperature of the cooling air results in a reduction of the cooling capability of the air and may have a negative impact on alternator performance.

SUMMARY OF THE INVENTION

A belt-driven electric machine for a vehicle includes a front housing including at least one front housing hole and a rear housing including at least one rear housing hole. The electric machine further includes at least one fan capable of urging cooling air into the electric machine through the at least one front housing hole and out of the electric machine through the at least one rear housing hole.

A method for cooling a belt-driven electric machine for a vehicle includes urging cooling air into the electric machine at substantially the front of the electric machine. The cooling air is flowed substantially rearward in the electric machine, and heat is radiated from the electric machine into the cooling air. At least a first portion of the cooling air is expelled from the rear of the electric machine in a substantially axial direction.

DESCRIPTION OF THE DRAWINGS

The above, as well as other advantages of the present invention, will become readily apparent to those skilled in the art from the following detailed description when considered in light of the accompanying drawings in which.

DETAILED DESCRIPTION OF THE INVENTION

Figure 1:
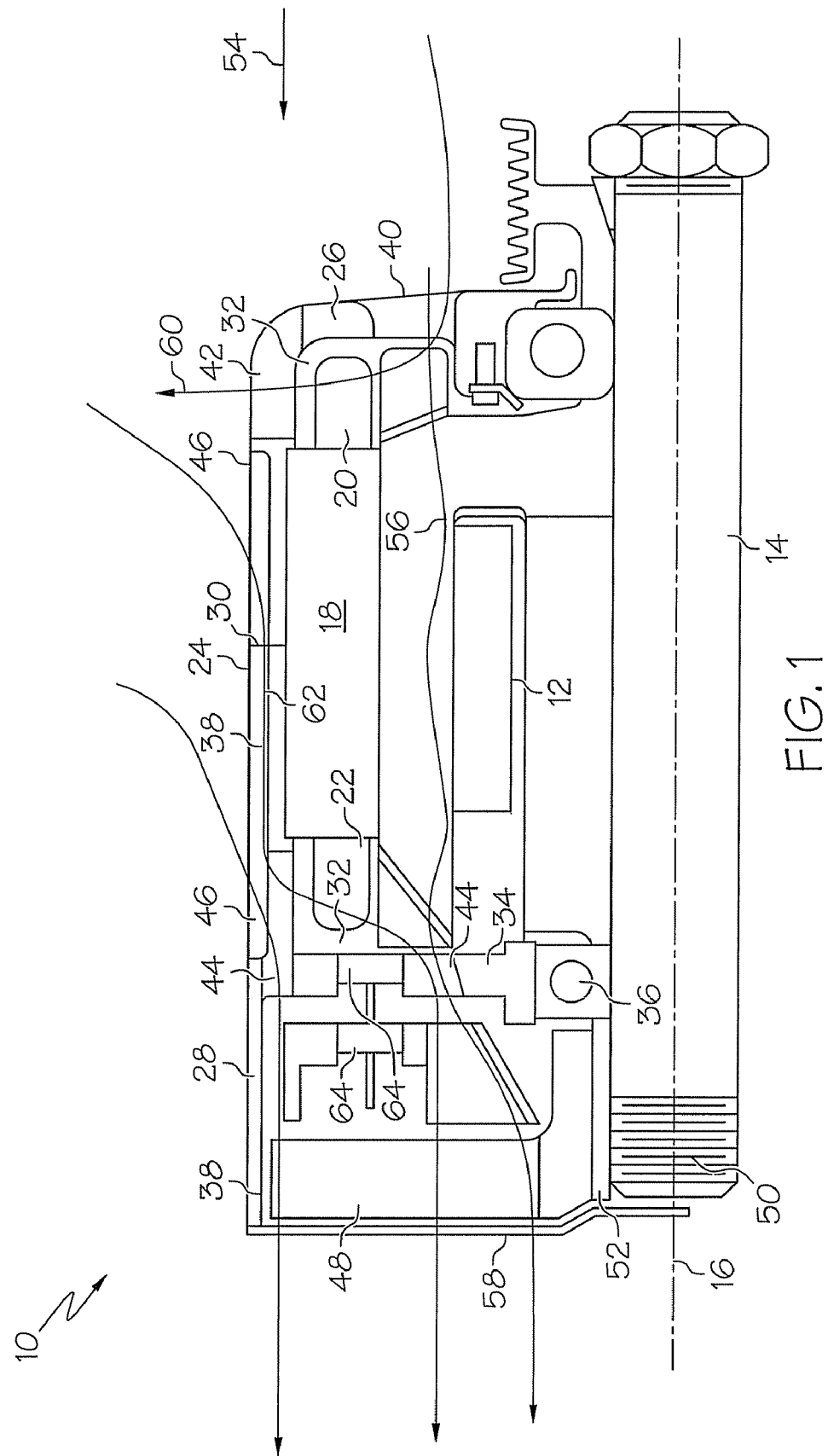
FIG. 1 is a cross sectional view of an embodiment of an electric machine for a vehicle having an improved cooling airflow.

Shown in FIG. 1 is a belt-driven electric machine for a vehicle, for example, an alternator 10. The alternator 10 includes a rotor 12 which is operably connected to a shaft 14. The rotor 12 and shaft 14 are configured and disposed to rotate about a shaft axis 16. A stator 18 includes forward end turns 20 and rear end turns 22 and is disposed radially outboard of the rotor 12. The stator 18 extends axially along a length of the rotor 12 and circumferentially around the rotor 12. The stator 18 and rotor 12 are disposed within a housing 24, which in one embodiment includes a front housing 26 and a rear housing 28. The alternator 10 is positioned in a vehicle (not shown) such that the front housing 26 substantially faces the front of the vehicle and the rear housing 28 substantially faces the rear of the vehicle. Between the front housing 26 and the rear housing 28 is a joint 30 which in some embodiments is disposed substantially axially. Further, the joint 30 may in some embodiments be a gap which extends circumferentially around the alternator 10. The front housing 26 and/or the rear housing 28 may include one or more cooling ribs 32 in some embodiments to increase cooling capacity.

The rear housing 28 in one embodiment has a substantially T-shaped cross section. A leg 34 extends substantially radially toward the shaft 14 and provides support to a rear bearing 36, while arms 38 extend axially forward and rearward from the leg 34.

The front housing 26 includes one or more front face cooling holes 40 and one or more outer cooling holes 42. Similarly, the rear housing 28 includes one or more rear face cooling holes 44. Some embodiments may include one or more circumferential slots 46. The circumferential slots 46 are through an outer longitudinal surface of the housing 24, and may be disposed in the front housing 26 and/or the rear housing 28. In the embodiment shown in FIG. 1, each circumferential slot 40 is partially disposed in the front housing 26 and partially disposed in the rear housing 28, extending across the joint 30.

In some embodiments, the alternator 10 includes at least one fan 48. In the embodiment shown in FIG. 1, the fan 48 is disposed at a threaded portion 50 of the shaft 14 and fixed to the shaft 14 utilizing a sleeve 52. The fan 48 is configured to provide both radial and axial flow. Other fan 48 configurations, locations, and attachment methods, however, are contemplated within the current scope. For example, the fan 48 may be configured for purely axial flow, and/or the fan 48 may be fixed to an unthreaded shaft 14. Further, additional fans 48 could be disposed forward of the rotor 12 and/or rearward of the rotor 12.

Figure 2:
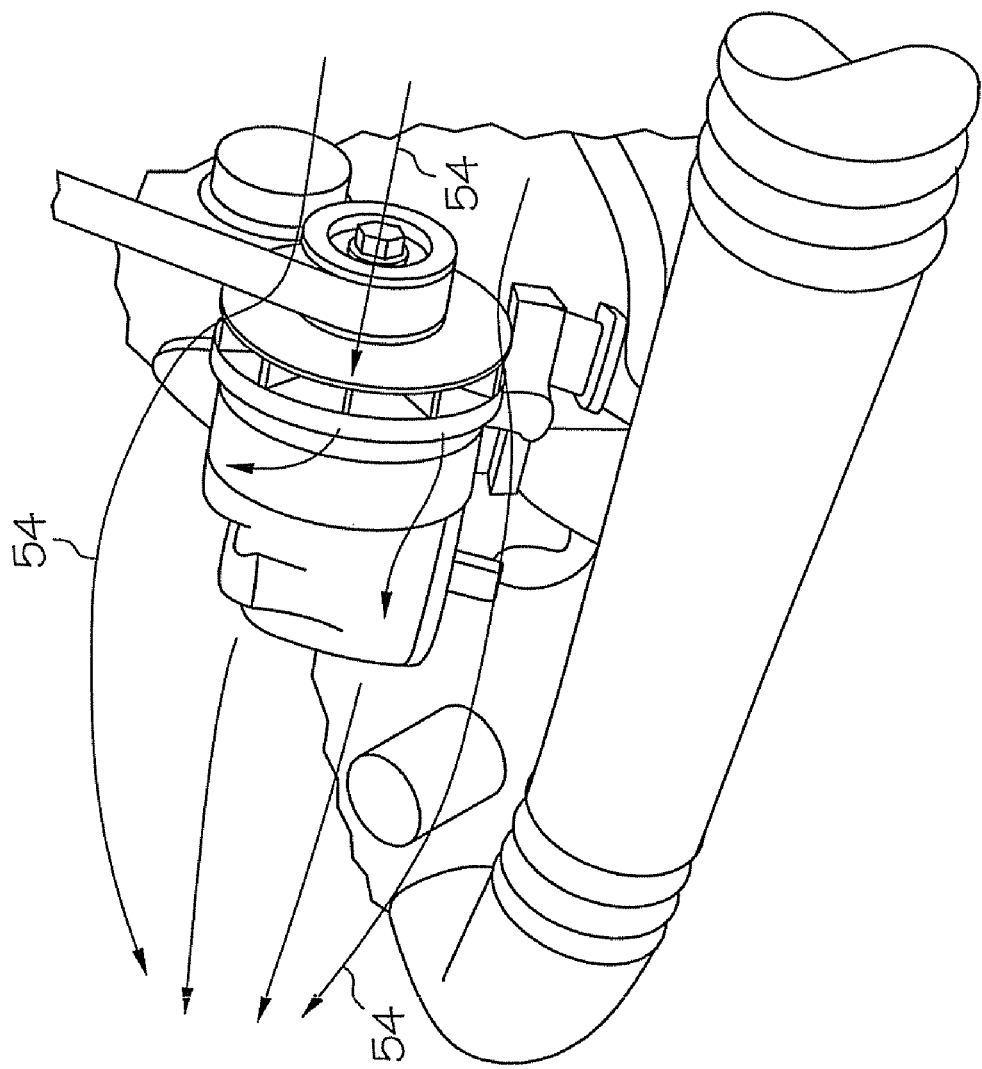
FIG. 2 is an illustration of cooling airflow relative to underhood airflow of the electric machine of FIG. 1.

To cool the alternator 10, cooling air is drawn into the front housing 26 through the front face cooling holes 40. This may be accomplished by a natural underhood airflow, the direction of which is illustrated by arrow 54 (see also FIG. 2), from the front to the rear of the vehicle and/or by action of the fan 48. Once through the front face cooling holes 40, the airflow may, in some embodiments, split. A first portion flows axially through the alternator 10 as shown by flowline 56, through rear face cooling holes 44, through the fan 48, and finally exiting the alternator 10 through a cover plate 58. A second portion of the airflow, as illustrated by flowline 60, flows radially across forward end turns 20 and exits the alternator 10 through the outer cooling holes 42.

Cooling air also enters the alternator 10 through the circumferential slots 46. The flow of this cooling air is illustrated by flowline 62. The cooling air flows axially along the stator 18, and across the rear end turns 22. The air then flows substantially axially through the rear housing 28, providing cooling to one or more diodes 64, to the rear bearing 36, and/or to other components of the electric machine. The air then flows through the fan 48 and exits through the cover plate 58.

The heated exhaust air is urged away from the alternator 10 by the fan 48 in the natural direction of underhood airflow toward the rear of the vehicle. By flowing cooling air through the alternator 10 in the manner described above, heated air is not recirculated into the alternator 10, thereby maintaining optimal performance of the alternator 10.

While embodiments of the invention have been described above, it will be understood that those skilled in the art, both now and in the future, may male various improvements and enhancements which fall within the scope of the claims which follow. These claims should be construed to maintain the proper protection for the invention first described.

What is claimed is:

1. A belt-driven electric machine for a vehicle comprising:
a front housing including at least one front housing opening disposed at a front surface of the front housing;
a rear housing including at least one rear housing opening disposed at a rear surface of the rear housing; and
at least one fan disposed in the rear housing capable of urging cooling air into the electric machine through the at least one front housing opening and out of the electric machine through the at least one rear housing opening, the rear housing configured only for exit of the cooling air from the electric machine to direct the cooling air away from the electric machine in a natural direction of airflow of the vehicle.

2. The electric machine of claim 1 further comprising one or more slots disposed in a longitudinal surface of at least one of the front housing and the rear housing.

3. The electric machine of claim 2 wherein the one or more slots are disposed in a substantially axial direction.

4. The electric machine of claim 1 wherein the at least one fan is three fans.

5. The electric machine of claim 1 wherein the at least one fan is two fans.

6. The electric machine of claim 1 wherein the rear housing has a substantially T-shaped cross section.

7. The electrical machine of claim 6 wherein the rear housing includes a leg extending substantially radially inward.

8. The electrical machine of claim 7 wherein the leg provides support for a rear bearing.

9. The electric machine of claim 1 wherein at least one of the front housing and rear housing include one or more cooling ribs.

10. A method for cooling a belt-driven electric machine for a vehicle comprising:
urging cooling air into the electric machine at a front surface of a front housing of the electric machine via at least one fan disposed in a rear housing of the electric machine;
flowing the cooling air substantially rearward in the electric machine;
radiating heat from the electric machine into the cooling air; and
expelling a least a first portion of the cooling air from a rear surface or a rear housing of the electric machine in a substantially axial direction, the rear surface of the rear housing configured for only for exit of the cooling air from the electric machine, the cooling air directed away from the electric machine in a natural direction of airflow of the vehicle.

11. The method of claim 10 wherein the urging of cooling air into the electric machine is performed by at least one fan.

12. The method of claim 10 further comprising cooling stator one or more end turns with a second portion of the cooling air.

13. The method of claim 12 further comprising expelling the second portion of cooling air from the electric machine in a radial direction.

14. The method of claim 10 further comprising urging a third portion of cooling air into the electric machine through slots in a longitudinal surface of the electric machine.

15. The method of claim 14 further comprising cooling a rear bearing with the third portion of cooling air.

16. The method of claim 14 further comprising cooling one or more diodes with the third portion of cooling air.

17. The method of claim 14 further comprising expelling the third portion of cooling air from the electric machine in a substantially axial direction.

\* \* \* \* \*